Dec. 13, 1966
R. W. CARNEY ETAL
3,291,839
PRODUCTION OF ACETALDEHYDE
Filed Dec. 26, 1962
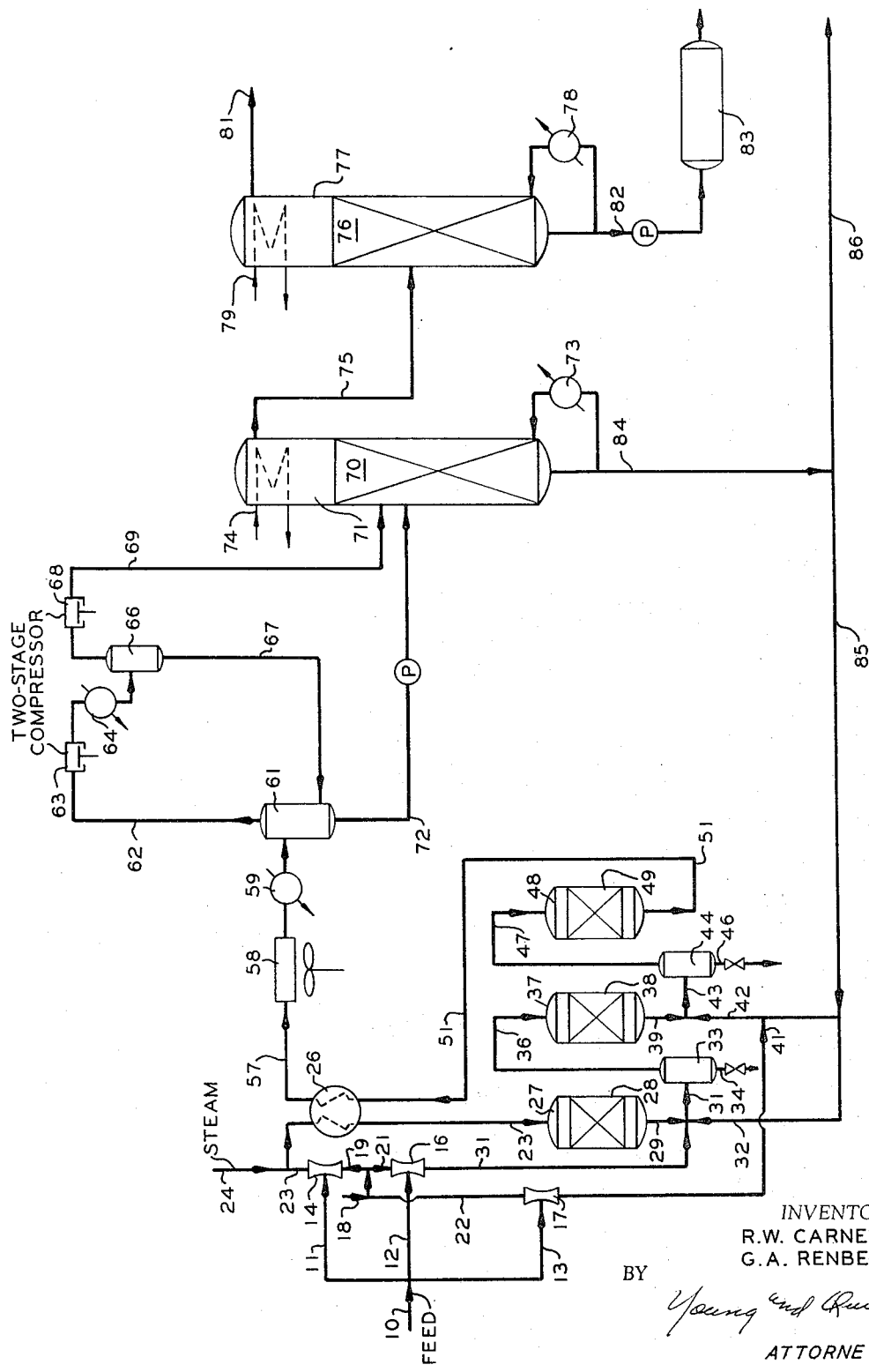
INVENTORS
R.W. CARNEY
G.A. RENBERG
BY
*Young and Quigg*
ATTORNEYS United States Patent Office 3,291,839
Patented Dec. 13, 1966

3,291,839
PRODUCTION OF ACETALDEHYDE
Richard W. Carney and Graham A. Renberg, Bartlesville, Okla., assignors to Phillips Petroleum Company, a corporation of Delaware
Filed Dec. 26, 1962, Ser. No. 247,028
7 Claims. (Cl. 260—605)

This invention relates to the production of acetaldehyde. In one aspect this invention relates to a method and apparatus for the production of acetaldehyde by hydration of acetylene with steam. In another aspect this invention relates to temperature control in a reaction zone wherein a strongly exothermic reaction is being carried out.

Hydration of acetylene by reaction with steam in the presence of a suitable solid catalyst is a well known reaction wherein one mol of acetylene reacts with one mol of water to form one mol of acetaldehyde. The reaction is strongly exothermic, liberating 1580 B.t.u.'s per pound of acetaldehyde formed. This creates serious problems in carrying out the reaction on a commercial scale. When the operation is carried out adiabatically on a feed stream containing any appreciable concentration of acetylene the resulting temperature increase on the process stream cannot be tolerated because of equipment limitations and, more seriously, process difficulties such as loss of catalyst selectivity and polymerization or oil formation. In the past, attempts have been made to solve this problem in various ways such as by increasing the steam to acetylene ratio to provide more steam to remove the heat of reaction, and by employing reactors provided with elaborate cooling means. Such complicated reactors are expensive and, in general, leave much to be desired. When the steam to acetylene ratio is increased for purposes of temperature control, the amount of steam required for the process is increased even though the excess steam is not actually consumed in the reaction. Thus, neither of said methods for solving the problem has been entirely satisfactory. Increasing the steam to acetylene ratio is the more commonly used method of temperature control. However, since steam represents an appreciable expense item, it is desirable to reduce the amount of steam required in the process.

When employing presently known catalysts, we have found the lower temperature limit necessary to obtain a reasonable reaction rate is about 500 to 650° F., preferably 550 to 600° F. In order to prevent polymerization and oils formation, we have found the upper temperature limit for the reaction is about 750 to 850° F., preferably 750 to 800° F. Thus, the maximum desirable increase in temperature of the process stream across a reactor is about 300° F., preferably 200° F. We have now discovered that the process can be operated within the limits of said 300° F. increase in temperature by passing individual portions of the acetylene stream through individual reactors of a plurality of reactors in parallel but passing all of the steam through said plurality of reactors in series. We have found that by operating in this manner excellent temperature control can be obtained and, equally as important, at the same time reduce the amount of steam required to carry out the process.

Thus, in one broad aspect, in a process for the catalytic hydration of acetylene with steam, the present invention resides in the improvement of operating a plurality of reactors in parallel with respect to individual portions of the acetylene, but in series with respect to the steam; and an improved apparatus for carrying out said hydration reaction.

An object of this invention is to provide an improved process for the hydration of acetylene with steam. Another object of this invention is to provide a method for controlling the temperature in a reaction zone wherein a strongly exothermic reaction is being carried out. Still another object of this invention is to provide a method for reducing the over-all steam to acetylene ratio required in a process for the hydration of acetylene with steam. Still another object of this invention is to provide an improved apparatus for carrying out the hydration of acetylene with steam. Other aspects, objects, and advantages of the invention will be apparent to those skilled in the art in view of this disclosure.

According to the invention, there is provided a process for the production of acetaldehyde, which process comprises: passing a stream of steam through a series of reaction zones in series flow; passing individual portions of a feed stream comprising acetylene in parallel into individual reaction zones of said series of reaction zones; in said reaction zones, reacting said steam and said acetylene under reaction conditions in the presence of a catalyst capable of catalyzing the formation of acetaldehyde; and recovering acetaldehyde product from the effluent from the last reaction zone of said series of reaction zones.

Further according to the invention, there is provided apparatus for the production of acetaldehyde by the catalytic hydration of acetylene with steam, which comprises: a steam conduit, connected at one end to a source of steam supply and at the other end to a reactor; an eductor disposed in said steam conduit; and an acetylene feed stream conduit connected into the throat of said eductor.

The following description of the drawing and specific example will serve to more fully explain the invention. Said drawing is a diagrammatic flow sheet and illustrates a presently preferred embodiment of the invention. It is to be understood that many valves, pressure gauges, pumps, etc., not necessary for explaining the invention to those skilled in the art, have been omitted so as to simplify said drawing. Also, while the description of said drawing is in terms of and is combined with a specific example, it is to be understood that the invention is not limited to said specific example. The description of the drawing has been combined with the specific example solely in the interests of brevity.

EXAMPLE I

Referring now to said drawing, a feed stream comprising acetylene is introduced via conduit 10 and is then split into three approximately equal portions in conduits 11, 12, and 13. Said three feed streams are introduced into the throat of venturi aspirators or eductors 14, 16, and 17, respectively. A stream of steam from conduit 18 is divided into three approximately equal portions in conduits 19, 21, and 22, respectively, and then passed through said eductors 14, 16, and 17, respectively. As discussed further hereinafter, employing said eductors to introduce the acetylene into the reactors is one of the added features of the invention.

Eductor 14 discharges into conduit 23 and is therein combined with the main stream of process steam from conduit 24. The resulting mixture comprising acetylene and steam is passed through feed preheater 26, which comprises an indirect heat exchanger, and is therein heated to 600° F., the desired initial reaction temperature. The preheated feed mixture in conduit 23 is introduced into reactor 27 wherein it contacts a bed 28 of calcium orthophosphate catalyst promoted with 0.3 weight percent copper orthophosphate. A reaction mixture effluent comprising ethylene, some unreacted acetylene, acetaldehyde product, and steam is withdrawn from reactor 27 at a final temperature of 800° F. via conduit 29. Said reactor effluent is mixed in conduit 31 with the mixture of fresh feed and steam discharged from eductor 16. Quench water in conduit 32, from a source to be described hereinafter, is also mixed with said reactor effluent in conduit 31. The amount of quench water introduced from conduit 32 is an amount sufficient to reduce the temperature of the resulting mixture in conduit 31 to 600° F., said desired initial reaction temperature. Said resulting mixture is introduced into liquid knockout drum 33 provided with drain 34. Vapor effluent from said knockout drum 33 is introduced via conduit 36 into reactor 37 wherein it contacts a fixed bed 38 of calcium orthophosphate catalyst promoted with 0.3 percent copper orthophosphate.

A second reactor effluent having a composition similar to the effluent from reactor 27 is withdrawn from said reactor 37 at a temperature of 800° F. via conduit 39. The fresh feed and steam discharge from eductor 17 is passed via conduit 41 into conduit 42 wherein it is mixed with quench water from conduit 32. The resulting mixture in conduit 42 and said reactor effluent in 39 are mixed in conduit 43, said reactor effluent is quenched, and the resulting quenched mixture passed into liquid drum 44 which is provided with liquid drain 46. The amount of water introduced via conduit 42 is an amount sufficient to quench said reactor effluent in conduit 39 to a temperature of 600° F., said desired initial reaction temperature. Vapor effluent from knockout drum 44 is passed via conduit 47 and introduced into reactor 48 wherein it contacts a fixed bed 49 of said calcium orthophosphate catalyst. The volumes of catalyst in catalyst beds 28, 38, and 49, are the same, i.e., each contains 48 cubic feet of catalyst. Knockout drums 33 and 44 are provided as a safety measure to guard against the possibility of introducing liquid water into reactors 37 and 48. In normal operation said knockout drums are not necessary.

A third reactor effluent having a composition similar to the effluents from reactors 27 and 37 is withdrawn from reactor 48 at a temperature of 800° F. and passed via conduit 51 through said feed preheater 26 in indirect heat exchange with the feed stream in conduit 23 and is therein cooled to a temperature of about 535° F. The effluent from said feed preheater 26 is passed via conduit 57, through air fin cooler 58, and condenser 59, after which its temperature has been reduced to approximately 100° F. Effluent from said condenser 59 is passed into flash separator 61 wherein a flash separation between gases and liquids is effected. Said flash separator 61 is conveniently operated at a pressure of approximately 15 p.s.i.a.

The gas phase from said separator 61 is passed via conduit 62 into the low stage 63 of a two-stage compressor. Compressed gases from said low stage are passed through intercooler 64 and then into flash separator 66 wherein a flash separation between any liquids and gases is effected. Said flash separator 66 is conveniently operated at a pressure of approximately 50 p.s.i.a. Liquid from flash separator 66 is passed via conduit 67 into flash separator 61. Gases from flash separator 66 are passed into high stage 68 of said two-stage compressor wherein they are compressed to a pressure of about 170 p.s.i.a.

Said compressed gases are passed via conduit 69 and introduced into the packed section 70 of fractionator 71. A portion of said fractionator is packed with a suitable packing material such as Raschig rings as indicated. Liquid from flash separator 61 is passed via conduit 72 and also introduced into the packed section of said fractionator 71. A reboiler 73 is operatively connected into the bottom of said fractionator 71 and, operating in known conventional manner, supplies the necessary heat for the operation of said fractionator 71. A condenser 74 is provided in the top portion of said fractionator 71 and serves in known manner to maintain reflux conditions on said fractionator. Said fractionator 71 is conveniently operated at a pressure of about 150 p.s.i.a. with a top temperature of about 115° F. and a bottom temperature of about 357° F. An overhead stream comprising ethylene, some unreacted acetylene, and acetaldehyde product is withdrawn from the top of fractionator 71 and passed via conduit 75 into the packed section 76 of fractionator 77. A reboiler 78 and a condenser 79 are provided in fractionator 77 and operate in known manner to supply the necessary heat and reflux liquid for operation of fractionator 77. Said fractionator 77 is conveniently operated at a pressure of about 135 p.s.i.a., a top temperature of about —15° F., and a bottom temperature of about 108° F. A suitable refrigerant such as propane or propylene can be employed in condenser 79 to maintain said top temperature on fractionator 77.

A gas stream comprising ethylene and unreacted acetylene is withdrawn from the top of fractionator 77 via conduit 81. Acetaldehyde product stream is withdrawn from the bottom of fractionator 77 via conduit 82 and and passed into storage tank 83.

A stream comprising essentially water is withdrawn from the bottom of fractionator 71 via conduit 84. A small portion of this stream is passed via conduit 85 and conduits 32 and 42 and is used as quench liquid for the effluents from reactors 27 and 37, respectively, as previously described. The remainder of said water is disposed of via conduit 86.

The various flow rates employed in the above-described example are given below in Table I where the stream numbers refer to the line or conduit numbers shown in the drawing. In said Table I all flow rates are given in mols per hour.

*Table I*

| Stream No. and Description | Composition, Mols per Hour | | | | |
|---|---|---|---|---|---|
| | Ethylene | Acetylene | Acetaldehyde | Water | Total |
| 10 ..... Total fresh feed ........... | 11.1 | 25.9 | 0.0 | 0.0 | 37.0 |
| 18 ..... Steam to eductors ......... | 0.0 | 0.0 | 0.0 | 88.8 | 88.8 |
| 24 ..... Steam ..................... | 0.0 | 0.0 | 0.0 | 237.5 | 237.5 |
| 23 ..... Feed—reactor 27 .......... | 3.0 | 7.0 | 0.0 | 261.5 | 271.5 |
| 29 ..... Effluent—reactor 27 ....... | 3.0 | 1.0 | 6.0 | 255.5 | 265.5 |
| 32 ..... Quench ................... | 0.0 | 0.0 | 0.0 | 13.6 | 13.6 |
| 36 ..... Feed—reactor 37 .......... | 6.7 | 9.6 | 6.0 | 298.6 | 320.9 |
| 39 ..... Effluent—reactor 37 ....... | 6.7 | 2.3 | 13.3 | 291.3 | 313.6 |
| 42 ..... Quench ................... | 0.0 | 0.0 | 0.0 | 17.1 | 17.1 |
| 85 ..... Total quench ............. | 0.0 | 0.0 | 0.0 | 30.7 | 30.7 |
| 47 ..... Feed—reactor 48 .......... | 11.1 | 12.6 | 13.3 | 343.7 | 380.7 |
| 51 ..... Effluent—reactor 48 ....... | 11.1 | 3.9 | 22.0 | 335.0 | 372.0 |
| 62 ..... Vapor to compressor ...... | 7.3 | 2.2 | 4.51 | 0.78 | 14.79 |
| 67 ..... Liquid from sep. 66 ....... | 0.02 | 0.01 | 0.10 | 0.56 | 0.69 |
| 69 ..... Vapor to fract. 71 ........ | 7.28 | 2.19 | 4.41 | 0.22 | 14.10 |
| 72 ..... Liquid to fract. 71 ........ | 3.82 | 1.71 | 17.59 | 334.78 | 357.90 |
| ....... Total feed to fract. 71 ..... | 11.1 | 3.9 | 22.0 | 335.0 | 372.0 |
| 84 ..... Bottoms—fract. 71 ........ | 0.02 | 0.04 | 0.1 | 334.86 | 335.02 |
| 75 ..... Overhead—fract. 71 ....... | 11.08 | 3.86 | 21.9 | 0.14 | 36.98 |
| 81 ..... Overhead—fract. 77 ....... | 11.03 | 3.80 | 0.1 | 0.0 | 14.93 |
| 82 ..... Bottoms—fract. 77 (acetaldehyde product). | 0.05 | 0.06 | 21.8 | 0.14 | 22.05 |

Inspection of the data in Table I above shows that the steam to acetylene mol ratio in reactors 27, 37, and 48 is 37.3, 31.0, and 27.2, respectively. Said data also show that the over-all steam to acetylene mol ratio for the process is 13.8 when the water introduced as quench through conduits 32 and 42 is included, and is 12.6 when calculated on the basis of not including said quench water. As used herein, the term "over-all steam to acetylene mol ratio" refers to the ratio calculated on the basis of the total acetylene in the original feed stream.

EXAMPLE II

When the acetylene in a feed stream having the composition of stream 10 in Table I is reacted with steam at a 12 to 1 steam to acetylene mol ratio in a single reactor, under conditions otherwise comparable to the conditions employed in Example I, it is found there is an increase of 560° F. in the temperature of the process stream.

EXAMPLE III

When the acetylene in a feed stream having the composition of stream 10 in Table I is divided into three approximately equal portions, said portions are passed in parallel through three individual reactors, individual streams of steam are also passed in parallel through said three reactors, and said acetylene and said steam are reacted in said reactors under conditions otherwise comparable to the conditions employed in Example I, it is found that a steam to acetylene mol ratio of approximately 37 to 1 is required in each reactor in order to maintain the temperature increase on the process stream at not more than 200° F. Thus, the over-all steam to acetylene ratio is 37 to 1.

A comparison of Example II with Example I shows that a steam to acetylene mol ratio of greater than 12 to 1 is required in order to prevent an excessive temperature increase on the process stream when the steam and acetylene are passed simultaneously through a single reactor.

Example III shows that an over-all steam to acetylene mol ratio of about 37 to 1 is required for this feed stream when the steam and acetylene are both passed through a plurality of reactors in parallel. This is an increase of 2.9 times over the 12.6 to 1 over-all steam to acetylene ratio of Example I (omitting the quench water) wherein the individual portions of the acetylene feed stream were passed through the reactors in parallel and the process steam was passed through said reactors in series. Those skilled in the art will readily recognize that the invention thus makes possible a very substantial reduction in the over-all steam to acetylene ratio.

Thus, Example I and Example III clearly demonstrate the effectiveness of the method of the invention in reducing the over-all steam to acetylene ratio in the hydration of acetylene with steam and at the same time very effectively controlling the temperature increase on the process stream.

The above-described reduction in over-all steam to acetylene ratio is an outstanding advantage of the invention because (1) it effects important savings in the steam cost per se and (2) it effects important savings in product recovery costs due to the smaller amount of water which it is necessary to handle in the product recovery equipment.

The above-described reduction in over-all steam to acetylene ratio is an outstanding advantage of the invention containing high concentrations of acetylene, e.g., from 5 to 100 percent acetylene, and is especially applicable to said streams containing from 50 to 100 percent acetylene. Said feed streams can be obtained from any suitable source. For example, mixtures containing acetylene such as are obtained by the thermal decomposition of hydrocarbons may be employed as the starting material. Another source of acetylene is various waste streams containing appreciable amounts of acetylene. For example, in the production of ethylene to be used in the manufacture of polyethylene, ethane is cracked to produce said ethylene. The cracking furnace effluent is then compressed, deoiled, and refrigerated to liquefy essentially all its components except hydrogen. A $C_2$ fraction is separated and then subjected to a dimethyl formamide solvent absorption step to remove acetylene therefrom. The acetylene-rich solvent is then flashed to remove the greater portion of the comparatively small amount of ethylene also absorbed by the solvent. Said acetylene-rich solvent is then passed to a stripper wherein the remaining ethylene and acetylene are recovered therefrom to obtain a stream rich in acetylene as overhead product from the stripper. Stream No. 10 in Table I was obtained in this manner.

Since a wide variety of catalysts can be employed in the practice of the invention, it is not intended to limit the invention to any particularly catalyst. Catalysts suitable for use in the practice of the invention are those which are capable of causing the hydration of acetylene with steam to form acetaldehyde. Examples of catalysts which can be employed in the practice of the invention include, among others, the following: zinc oxide, copper pyrophosphate, cadmium pyrophosphate, calcium orthophosphate, and said catalysts containing various promoters. In general, suitable catalysts which can be used in the practice of the invention include oxides, phosphates, silicates, and tungstates of metals such as zinc, copper, cadmium, and iron. These catalysts are known in the art for the hydration reaction between acetylene and steam to form acetaldehyde. Said catalysts can all be prepared by methods known in the art.

A presently preferred catalyst which can be employed in the practice of the invention is calcium orthophosphate promoted with suitable amounts of copper orthophosphate. As little as 0.01 weight percent of copper orthophosphate promoter will produce a good active catalyst; however, the optimum concentration of said promoter is in the order of 0.3 weight percent. Said catalyst can be prepared in any suitable manner. In one method, 0.7 gram of $Cu_3(PO_4)_2 \cdot H_2O$ and 200 grams of $Ca_3(PO_4)_2$ were suspended in about 3 liters of water and dried at 100–110° C. and then pelleted. The pellets were crushed and screened to give the desired 8–20 mesh catalyst. Analysis of the catalyst gave 0.12 percent copper. In another method, 100 grams of $Ca_3(PO_4)_2$ was added to an aqueous solution containing 0.6 gram of $$Cu(C_2H_3O_2)_2 \cdot H_2O$$

The mixture was stirred for 2 hours and the resulting $Cu_3(PO_4)_2$-$Ca_3(PO_4)_2$ catalyst was worked up as previously described. Analysis of this catalyst gave 0.16 percent copper.

In the practice of the invention, the operating conditions in reactors 27, 37, and 48 can vary over relatively wide ranges. However, said operating conditions are interrelated and when changing one variable consideration must be given to the effect on the other variables. As indicated above, the reaction can be carried out at temperatures within the range of 500 to 850° F., preferably 600 to 800° F. The maximum desirable increase in temperature on the process stream is 300° F., preferably 200° F. The actual temperatures employed in said reactors will depend to some extent on the particular type of catalyst employed. More active catalysts make possible employing lower temperatures.

The amount of steam employed in the practice of the invention will depend upon the maximum temperature increase which is desired or permissible on the process stream. In general, the steam to acetylene ratio in each of said recators 27, 37, and 48 will be within the range of from 25 to 60, preferably 25 to 40 mols of steam per mol of acetylene. The over-all steam to acetylene ratio for the process when carried out in accordance with the invention will usually be within the range of from 6 to 16, preferably 8 to 14, mols of steam per mol of acetylene.

The vapor hourly space velocity, based on acetylene, will usually be within the range of from 15 to 400, preferably 25 to 175, more preferably 35 to 125 volumes of acetylene per volume of catalyst per hour, calculated at standard conditions. However, it is within the scope of the invention to employ space velocities outside the above ranges.

In the practice of the invention, reactors 27, 37, and 48 are preferably operated at pressures ranging from slightly above atmospheric to approximately two atmospheres. For example, in Example I the pressure at the inlet to reactor 27 is approximately 30 p.s.i.a. and the pressure at the outlet of reactor 48 is approximately 15 p.s.i.a. However, it is within the scope of the invention to operate said reactors at higher pressures such as three or four atmospheres, or even higher. However, pressures above approximately two atmospheres are seldom necessary or advantageous.

The operating conditions for those process steps and elements of apparatus employed in recovering the acetaldehyde product from the reaction zone effluent, e.g., reactor 48 in the drawing, can be any conditions suitable for effecting the recovery of said product.

While the invention has been described in terms of employing quench water for cooling the reactor effluents in conduits 29 and 39, it will be understood that any other suitable means of cooling said effluents can be employed in the practice of the invention.

As indicated above, an added feature of the invention resides in the means and the method of introducing the acetylene into the reactor. In the practice of the invention, a venturi aspirator or eductor is employed to mix each of the plurality of portions of the acetylene feed stream with an individual portion of steam and then introduce each resulting mixture into one of the reactors. This method of introducing the acetylene into the reactor possesses a number of advantages. Said venturi aspirators or eductors eliminate the need for an acetylene compressor. This is extremely desirable from a safety standpoint. Undiluted acetylene cannot be compressed above about 30 p.s.i.g. without becoming an explosion hazard. In using said aspirators or eductors, for instance as in Example I, 300 p.s.i. steam is passed through the eductor and the acetylene or acetylene-containing stream, in the amount of about 1 mol of acetylene to 3 or 4 mols of said steam, is introduced into the throat of the aspirator or eductor and is thus aspirated into admixture with said steam. In so aspirating the acetylene, the eductor compresses said acetylene stream from a pressure of about 15 p.s.i.a. to a pressure of about 30 p.s.i.a. This is sufficient pressure to introduce the acetylene into the reactors. Suitable eductors and/or higher pressure steam streams capable of compressing the acetylene stream to higher pressures can be employed if desired or necessary.

Mixing and compression of the acetylene stream by means of said eductors are thus combined into one very simple operation carried out in a very simple piece of equipment containing no moving parts. While in the drawing the aspirator or eductors have been illustrated as being of the type wherein the stream to be aspirated is introduced directly into the throat or venturi of the eductor by means of a side connection, any suitable type of venturi aspirator or eductor can be employed in the practice of the invention.

Although not illustrated in the drawing, it will be understood by those skilled in the art that a fourth reactor can be employed in combination with the plurality of reactors shown. In such a combination a processing and regeneration cycle can be employed wherein one reactor is on regeneration while the remaining reactors are on process. Such methods and apparatus for regenerating catalysts are well known to those skilled in the art. For example, the above-described calcium orthophosphate catalyst can be readily regenerated by contacting same with air (about 75 to 150 cubic feet per cubic foot of catalyst per hour) and steam (about 50 to 100 pounds per cubic foot of catalyst per hour) at a temperature of 750 to 850° F. for a period of 8 to 12 hours.

While the invention has been described in terms of a plurality of reactors comprising three reactors, it will be understood that said plurality of reactors can be less, e.g., two or more, e.g., four or more, reactors.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. In a process for the production of acetaldehyde by the catalytic hydration of acetylene with steam wherein an acetylene containing feed stream is mixed with an excess of process steam, the resulting mixture is passed into a single reaction zone and therein contacted under acetaldehyde forming conditions of temperature and pressure with a catalyst capable of causing the hydration of acetylene to acetaldehyde, and acetaldehyde product is recovered from the effluent from said reaction zone, the improvement which comprises the steps of: passing said process steam through a plurality of individual reaction zones in series flow; dividing said feed stream into a plurality of approximately equal individual portions; passing said individual portions of said feed stream individually in parallel into individual reaction zones of said plurality of reaction zones, the mol ratio of steam to acetylene in each of said reaction zones being within the range of from 25 to 60 and the overall mol ratio of said process steam to total acetylene in said undivided feed stream being within the range of from 6 to 16; and recovering acetaldehyde product from the effluent from the last reaction zone in said plurality of reaction zones.

2. A continuous process for the production of acetaldehyde from acetylene, which process comprises the steps of: (1) dividing a feed stream comprising acetylene into a plurality of approximately equal portions; (2) passing said plurality of portions individually at a predetermined initial reaction temperature in parallel into individual reaction zones of a corresponding plurality of reaction zones; (3) passing an excess of steam into a first reaction zone of said plurality of reaction zones and in said first reaction zone, forming acetaldehyde by reacting acetylene and steam under acetaldehyde forming conditions of temperature and pressure in the presence of a catalyst capable of catalyzing the formation of acetaldehyde; (4) withdrawing reaction mixture effluent at an elevated final reaction temperature from said first reaction zone, the difference between said initial temperature and said final temperature being not greater than about 300° F.; (5) cooling said effluent from said final temperature to said initial temperature; (6) passing said cooled effluent into a succeeding reaction zone of said plurality of reaction zones together with said portion of said feed stream passed thereto; (7) repeating said Steps 4, 5, and 6 for said succeeding reaction zone and any further succeeding reaction zones except the last reaction zone which succeeds said first mentioned succeeding reaction zone in said plurality of reaction zones, whereby said individual portions of said feed stream pass through individual reaction zones of said plurality of reaction zones in parallel and said steam passes through said plurality of reaction zones in series to provide a mol ratio of steam to acetylene in each of said reaction zones within the range of from 25 to 60 and an overall mol ratio of process steam to total acetylene in said individed feed stream within the range of from 6 to 16; (8) and recovering acetaldehyde product from the effluent from the last reaction zone of said plurality of reaction zones.

3. In a process for the production of acetaldehyde by the catalytic hydration of acetylene with steam wherein a feed stream comprising acetylene is mixed with an excess of process steam, the resulting mixture is passed into a single reaction zone and therein contacted under acetaldehyde forming conditions with a catalyst capable of causing the hydration of acetylene to acetaldehyde, and acetaldehyde product is recovered from the effluent from said reaction zone, the improvement which comprises the steps of: (1) dividing said feed stream into a plurality of approximately equal portions; (2) passing individual portions of said plurality of portions of said feed stream individually in parallel into individual reaction zones of a corresponding plurality of reaction zones at a predetermined initial reaction temperature; (3) passing said process steam into a first reaction zone of said plurality of reaction zones; (4) withdrawing effluent comprising unreacted excess steam and acetaldehyde product at an elevated final reaction temperature from said first reaction zone; (5) cooling said effluent from said final temperature to said initial temperature; (6) passing said cooled effluent into a succeeding reaction zone of said plurality of reaction zones together with said portion of said feed stream passed thereto; (7) repeating said Steps 4, 5, and 6 for said succeeding reaction zone and any further succeeding reaction zones except the last reaction zone which succeeds said first mentioned succeeding reaction zone in said plurality of reaction zones, whereby said portions of said feed stream pass through said plurality of reaction zones in parallel and said process steam passes through said plurality of reaction zones in series to provide a mol ratio of steam to acetylene in each of said reaction zones within the range of from 25 to 60 and an over-all mol ratio of process steam to total acetylene in said undivided feed stream within the range of from 6 to 16; and recovering acetaldehyde product from the last reaction zone of said plurality of reaction zones.

4. A process for the production of acetaldehyde from acetylene, which process comprises: dividing a feed stream comprising acetylene into a pair of approximately equal portions; passing said pair of portions individually at a predetermined initial reaction temperature in parallel into a pair of reaction zones; passing an excess of process steam into the first reaction zone of said pair of reaction zones and in said first reaction zone forming acetaldehyde by reacting acetylene and steam under acetaldehyde forming conditions of temperature and pressure in the presence of a catalyst capable of catalyzing the formation of acetaldehyde; withdrawing reaction mixture effluent comprising unreacted excess steam and acetaldehyde product at an elevated final reaction temperature from said first reaction zone, the difference between said initial temperature and said final temperature being not greater than about 300° F.; cooling said effluent from said final temperature to said initial temperature; passing said cooled effluent into the second reaction zone of said pair of reaction zones together with said portion of said feed steam passed thereto, whereby said individual portions of said feed stream pass through individual reaction zones of said pair of reaction zones in parallel and said process steam passes through said recation zones in series to provide a mol ratio of steam to acetylene in each of said reaction zones within the range of from 25 to 60 and an overall mol ratio of process steam to total acetylene in said undivided feed stream within the range of from 6 to 16; in said second reaction zone, forming additional acetaldehyde by reacting acetylene and steam under acetaldehyde forming conditions of temperature and pressure in the presence of a catalyst capable of catalyzing the formation of acetaldehyde; withdrawing reaction mixture from said second reaction zone; and recovering acetaldehyde product from said effluent from said second reaction zone.

5. A process for the production of acetaldehyde from acetylene, which process comprises: dividing an original feed stream comprising acetylene into approximately equal first, second, and third portions; mixing said first portion of feed stream with an excess of process steam and passing the resulting mixture into a first reaction zone at a predetermined initial reaction temperature within the range of from about 500 to about 650° F.; in said first reaction zone forming acetaldehyde by reacting acetylene and steam under acetaldehyde forming conditions of temperature and pressure in the presence of a catalyst capable of catalyzing the formation of acetaldehyde; withdrawing a first reaction mixture effluent comprising unreacted excess steam and acetaldehyde product at an elevated final reaction temperature within the range of from about 750 to about 850° F. from said first reaction zone, the difference between said initial temperature and said final temperature being not greater than about 300° F.; cooling said first reaction mixture effluent from said final temperature to said initial temperature; passing said cooled first reaction mixture effluent without separation of unreacted excess steam and acetaldehyde product therefrom, together with said second portion of feed stream, into a second reaction zone at a predetermined initial reaction temperature within the range of from about 500 to about 650° F.; in said second reaction zone, forming additional acetaldehyde by reacting acetylene and steam under acetaldehyde forming conditions of temperature and pressure in the presence of another portion of said catalyst; withdrawing a second reaction mixture effluent comprising unreacted excess steam and acetaldehyde product at an elevated final reaction temperature within the range of from about 750 to about 850° F. from said second reaction zone, the difference between said initial temperature and said final temperature being not greater than about 300° F.; cooling said second reaction mixture effluent from said final temperature to said initial temperature; passing said cooled second reaction mixture effluent without separation of unreacted excess steam and acetaldehyde product therefrom, together with said third portion of feed stream, into a third reaction zone at a predetermined initial reaction temperature within the range of from about 500 to about 650° F.; in said third reaction zone, forming additional acetaldehyde by reacting acetylene and steam under acetaldehyde forming conditions of temperature and pressure in the presence of another portion of said catalyst; withdrawing a third reaction mixture effluent comprising steam and acetaldehyde product at an elevated final reaction temperature within the range of from about 750 to about 850° F. from said third reaction zone, the difference between said initial temperature and said final temperature being not greater than about 300° F.; the mol ratio of steam to acetylene in each of said first, second, and third reaction zones being within the range of from 25 to 60, and the overall mol ratio of said process steam to the total acetylene in said original undivided feed stream being within the range of from 6 to 16; and recovering acetaldehyde product from said third reaction mixture effluent.

6. A process for the production of acetaldehyde from acetylene, which process comprises: dividing an original feed stream comprising acetylene into approximately equal first, second, and third portions; mixing said first portion of feed stream with an excess of process steam and passing the resulting mixture into a first reaction zone at an initial reaction temperature within the range of from about 500 to 650° F.; in said first reaction zone, forming acetaldehyde by reacting acetylene and steam in the presence of a solid catalyst capable of catalyzing the formation of acetaldehyde; withdrawing a first reaction mixture effluent comprising unreacted excess steam and acetaldehyde product at an elevated final reaction temperature within the range of from about 750 to 850° F. from said first reaction zone, the difference between said initial reaction temperature and said final reaction temperature being not more than 300° F.; admixing sufficient water with said first reaction mixture effluent to cool same to said initial reaction temperature; passing said cooled first reaction mixture effluent without separation of excess steam and acetaldehyde product therefrom, together with said second portion of feed stream, into a second reaction zone at said initial reaction temperature; in said second reaction zone, forming additional acetaldehyde by reacting acetylene and steam in the presence of another portion of said catalyst; withdrawing a second reaction mixture effluent comprising unreacted excess steam and acetaldehyde product at an elevated final reaction temperature within the range of from 750 to 850° F. from said second reaction zone, the difference between said initial reaction temperature and said final reaction temperature being not more than 300° F.; admixing sufficient water with said second reaction mixture effluent to cool same to said initial reaction temperature; passing said cooled second reaction mixture effluent without separation of excess steam and acetaldehyde product therefrom, together with said third portion of feed stream, into a third reaction zone at said initial reaction temperature; in said third reaction zone, forming additional acetaldehyde by reacting acetylene and steam in the presence of another portion of said catalyst; withdrawing a third reaction mixture effluent comprising steam and acetaldehyde product at an elevated final reaction temperature of from about 750 to 850° F. from said third reaction zone; and recovering acetaldehyde product from said third reaction mixture effluent; the mol ratio of steam to acetylene in each of said first, second, and third reaction zones being within the range of from 25 to 60, and the over-all mol ratio of said process steam to the total acetylene in said original undivided feed stream being within the range of from 6 to 16.

7. The process of claim 6 wherein said catalyst is calcium orthophosphate promoted with copper orthophosphate.

References Cited by the Examiner

UNITED STATES PATENTS

| 1,247,270 | 4/1916 | Hibbert | 260—605 |
| 2,045,841 | 2/1931 | Dreyfus | 260—605 |
| 2,552,260 | 5/1951 | Cooper et al. | 23—263 |
| 2,813,138 | 11/1957 | MacQueen | 23—277 |
| 3,002,017 | 9/1961 | Wearsch et al. | 23—260 |
| 3,014,959 | 12/1961 | Marti et al. | 260—656 |
| 3,100,139 | 8/1963 | Neubner et al. | 23—260 |

FOREIGN PATENTS

| 329,867 | 5/1930 | Great Britain. |
| 332,635 | 7/1930 | Great Britain. |

LEON ZITVER, *Primary Examiner.*

J. J. SETELIK, R. H. LILES, *Assistant Examiners.*